United States Patent [19]

Hill

[11] 4,222,099
[45] Sep. 9, 1980

[54] POWER SUPPLY

[75] Inventor: James J. Hill, North Miami, Fla.

[73] Assignee: Medi-Technical Corporation, Miami, Fla.

[21] Appl. No.: 950,738

[22] Filed: Oct. 12, 1978

[51] Int. Cl.$^2$ ............................................. H02M 7/00
[52] U.S. Cl. .................................... 363/101; 340/646
[58] Field of Search .................. 363/100, 101; 323/45, 323/43.5 R, 48-49; 340/644, 646, 686-687, 524-525

[56] References Cited

U.S. PATENT DOCUMENTS

| | | | |
|---|---|---|---|
| 2,613,260 | 10/1952 | Stevens | 340/646 |
| 2,736,009 | 2/1956 | Barnickel | 340/657 X |
| 3,041,464 | 6/1962 | Pritchett | 323/49 X |
| 3,349,320 | 10/1967 | Mathes | 323/45 X |
| 3,477,016 | 11/1969 | Papaleonidas | 323/48 |
| 3,855,521 | 12/1974 | Kiuchi | 323/43.5 R |
| 3,921,055 | 11/1975 | Dorsey | 363/100 |

Primary Examiner—Harry E. Moose, Jr.
Assistant Examiner—Peter S. Wong
Attorney, Agent, or Firm—Oltman and Flynn

[57] ABSTRACT

The present power supply has two step-up transformers with their respective primary and secondary windings series-connected. A half-wave rectifier tube and a filter are connected to the transformer secondary windings to rectify the current induced in them and to smooth out fluctuations in that current. One or more additional step-down transformers are provided, each having a primary winding that may be switched in series with the first-mentioned primary windings or disconnected from them and a secondary winding connected across a lamp. These additional transformers, when connected in the circuit, reduce the D.C. output voltage of the power supply and enable this output voltage to be selectively adjusted in steps. The lamps indicate visually which of these additional transformers are connected in the circuit.

4 Claims, 2 Drawing Figures

POWER SUPPLY

BRIEF SUMMARY OF THE INVENTION

This invention relates to a D.C. power supply having a transformer circuit for converting a relatively low A.C. supply voltage to a higher D.C. output voltage.

In accordance with the present invention the voltage step-up is provided by a plurality of small, lighter weight transformers instead of a single larger, heavier, more expensive transformer.

In accordance with one aspect of this invention, the D.C. output voltage of the present power supply may be adjusted in steps by switching various individual transformers into and out of the circuit.

Another aspect of this invention is concerned with the provision of an indicating "Fail Safe" lamp or lamps in the power supply circuit for indicating the output voltage setting to which it has been adjusted.

Further objects and advantages of this invention will be apparent from the following detailed description of two presently preferred embodiments, shown in the accompany drawings.

DETAILED DESCRIPTION

Before explaining the disclosed embodiments of the present invention in detail, it is to be understood that the invention is not limited in its application of the details of the particular arrangements shown, since the invention is capable of other embodiments. Also, the terminology used herein is for the purpose of description and not of limitation.

FIG. 1

Figure 1:
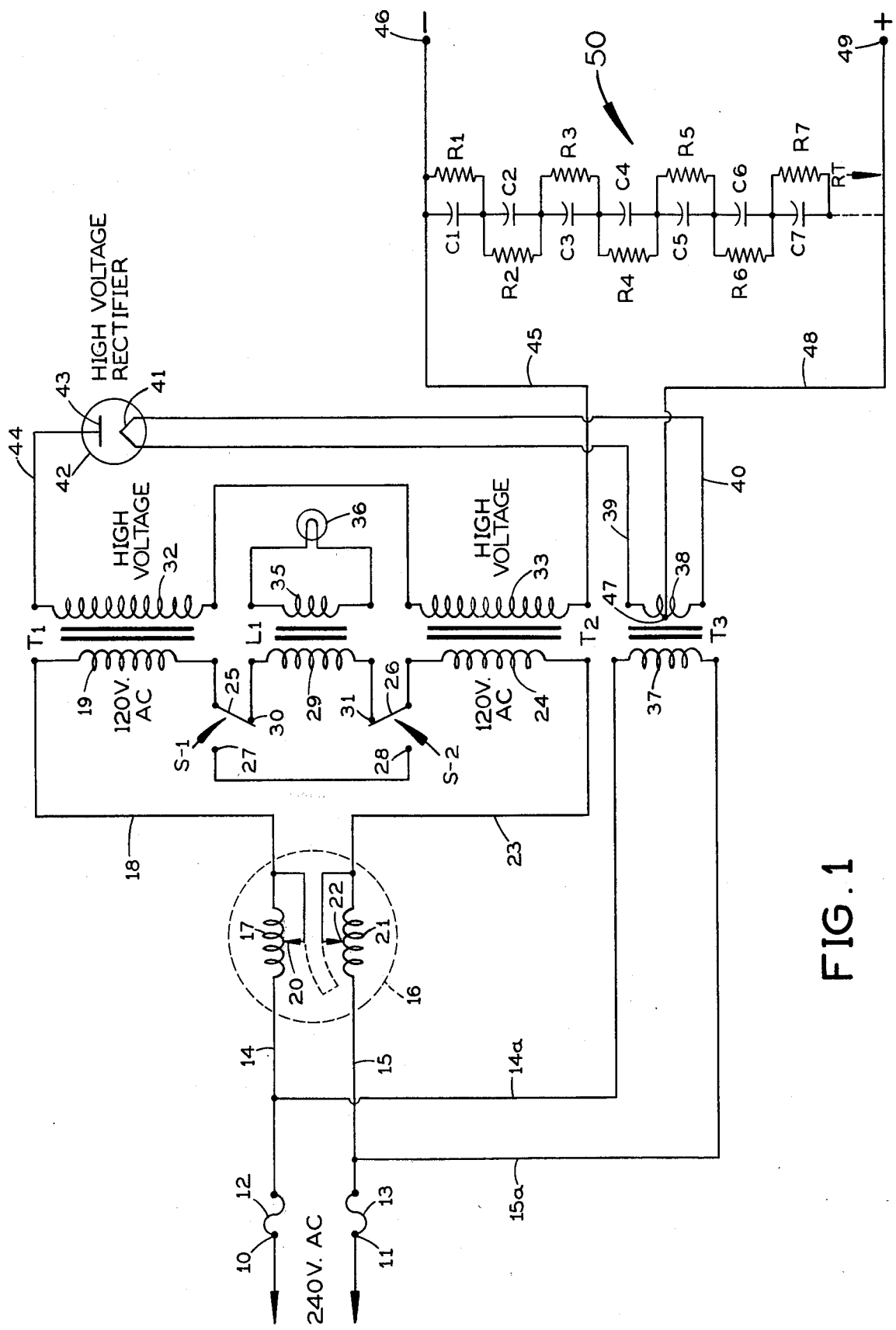
FIG. 1 is a circuit diagram of a first embodiment of the present power supply.

Referring to FIG. 1, the opposite terminals 10 and 11 of a 240 volts A.C. power supply are connected through respective fuses 12 and 13 to respective lines 14 and 15 which lead through a voltage-adjusting "Variac" 16 of conventional design.

This "Variac" has an upper winding 17 connected between line 14 and a line 18 leading to the upper end of the primary winding 19 of an upper transformer T-1 in the present power supply. An adjustable contact 20 is slidably engageable with the "Variac" winding 17 to short-circuit part of it, this adjustable contact being connected directly to line 18.

The "Variac" 16 has a lower winding 21 and an adjustable contact 22 similarly connected between line 15 and a line 23 leading to the lower end of primary winding 24 of a lower transformer T-2 in the power supply. Preferably, the primary windings 19 and 24 and identical.

The settings of the adjustable contacts 20 and 22 in the "Variac" determines the voltage applied across lines 18 and 23.

The upper primary winding 19 has its lower end connected to the mobile contact 25 of an upper primary switch S-1. The lower primary winding 24 has its upper end connected to the mobile contact 26 of a lower primary switch S-2. The upper primary switch S-1 has a first fixed contact 27 which is connected conductively to a corresponding first fixed contact 28 of the lower primary switch S-2. Accordingly, when the mobile contact 25 of the upper primary switch S-1 engages its first fixed contact 27 and the mobile contact 26 of the lower primary switch S-2 engages its first fixed contact 28, the two primary windings 19 and 24 will be connected in series with each other across lines 18 and 23. With the primary windings 19 and 24 being identical, the voltage drop across each will be one half the voltage across lines 18 and 23 under these settings of switches S-1 and S-2.

A third transformer L-1 has a primary winding 29 connected between a second fixed contact 30 of the upper primary switch S-1 and a second fixed contact 31 of the lower primary switch S-2. Thus, when the mobile contact 25 of the upper primary switch S-1 engages its second fixed contact 30 and the mobile contact 26 of the lower primary switch S-2 engages its second fixed contact 31, the primary winding 29 of the third transformer L-1 will be connected in series between the primary windings 19 and 24 of the upper and lower transformers T-1 and T-2 across lines 18 and 23. Consequently, the voltage appearing across each primary winding 19 and 24 is reduced by the presence of the third primary winding 29 in the circuit.

The mobile contacts of the switches S-1 and S-2 preferably are mechanically coupled to each other for operation in unison between their respective first and second fixed contacts.

The upper transformer T-1 has a secondary winding 32 which is inductively coupled to the primary winding 19 and has a substantially greater number of turns than the latter to provide a voltage step-up from the primary to the secondary. For example the turns ratio may be slightly more than 10 to 1, so that a voltage of 120 volts applied across the primary winding 19 will induce a voltage of about 2,500 volts across the secondary winding 32.

The lower transformer T-2 has a secondary winding 33 which is inductively coupled to the primary winding 19 and provides a similar voltage step-up in the secondary. The lower end of the upper secondary winding 32 is connected conductively to the upper end of the lower secondary winding 33.

The third transformer L-1 has a secondary winding 35 which is inductively coupled to the primary winding 29 and preferably provides a voltage step-down so that a given applied voltage across the primary winding 29 will induce a substantially lower voltage across the secondary winding 35. A lamp 36 is connected across the secondary winding 35.

An auxiliary transformer T-3 has a primary winding 37 which is connected via lines 14a and 15a across the A.C. power supply terminals 10 and 11 through the fuses 12 and 13. This auxiliary transformer has a secondary winding 38 which is inductively coupled to the primary winding 37 and is connected via lines 39 and 40 across cathode 41 of a high voltage rectifier tuve 42 of known design. The anode or plate 43 of this tube is connected via line 44 to the upper end of the upper secondary winding 32.

The lower end of the secondary winding 33 of the lower transformer T-2 is connected to a line 45 leading to the negative D.C. output terminal 46 of the present circuit. The secondary winding 38 of the auxiliary transformer T-3 has a center tap 47 which is connected through a line 48 to the positive D.C. output terminal 49 of the present circuit. A filter 50 consisting of series-connected R-C parallel combination, R1-C1, R2-C2, etc. is connected between lines 45 and 48 to smooth out fluctuations in the rectified D.C. voltage appearing across these lines.

OPERATION

In the operation of this circuit, when the primary switches S-1 and S-2 are positioned with their respective mobile contacts 25 and 26 engaging the first fixed contacts 27 and 28, the primary windings 19 and 24 are connected in series with each other across lines 18 and 23 and the third primary winding 29 is de-energized. Consequently, the full secondary voltage will appear across the series-connected secondary windings 32 an 33. This secondary voltage undergoes half wave rectification by the rectifier tube 42, and this rectified voltage is smoothed by the filter 50 to provide a substantially non-pulsating D.C. voltage across the output terminals 46 and 49 of the present power supply.

When it is desired to reduce this D.C. output voltage, the primary switches S-1 and S-2 may be operated to connect their respective mobile contacts 25 and 26 to the second fixed contacts 30 and 31. This puts the third primary winding 29 in series with the first and secondary primary windings 19 and 24 across lines 18 and 23, so that the voltage applied across each winding 19 and 24 is reduced in proportion to the added impedance provided by the winding 29 in the primary circuit. The reduction in the respective voltages applied across primary windings 19 and 24 produces a proportionate reduction of the voltages induced across the secondary windings 32 and 33, so that the rectified and smoothed voltage appearing across the output terminals 46 and 49 is reduced. The voltage applied across the third primary winding 29 induces a voltage across the corresponding secondary winding 35 which turns on the lamp 36 to indicate visually that the circuit is operating in the manner intended when switches S-1 and S-2 are operated, as described. Because of the voltage step-down in the third transformer 29, 35, the lamp 36 provides a convenient arrangement for a "Fail Safe" warning and low voltage testing of the circuit, in addition to providing the load in the secondary of this transformer.

FIG. 2

Figure 2:
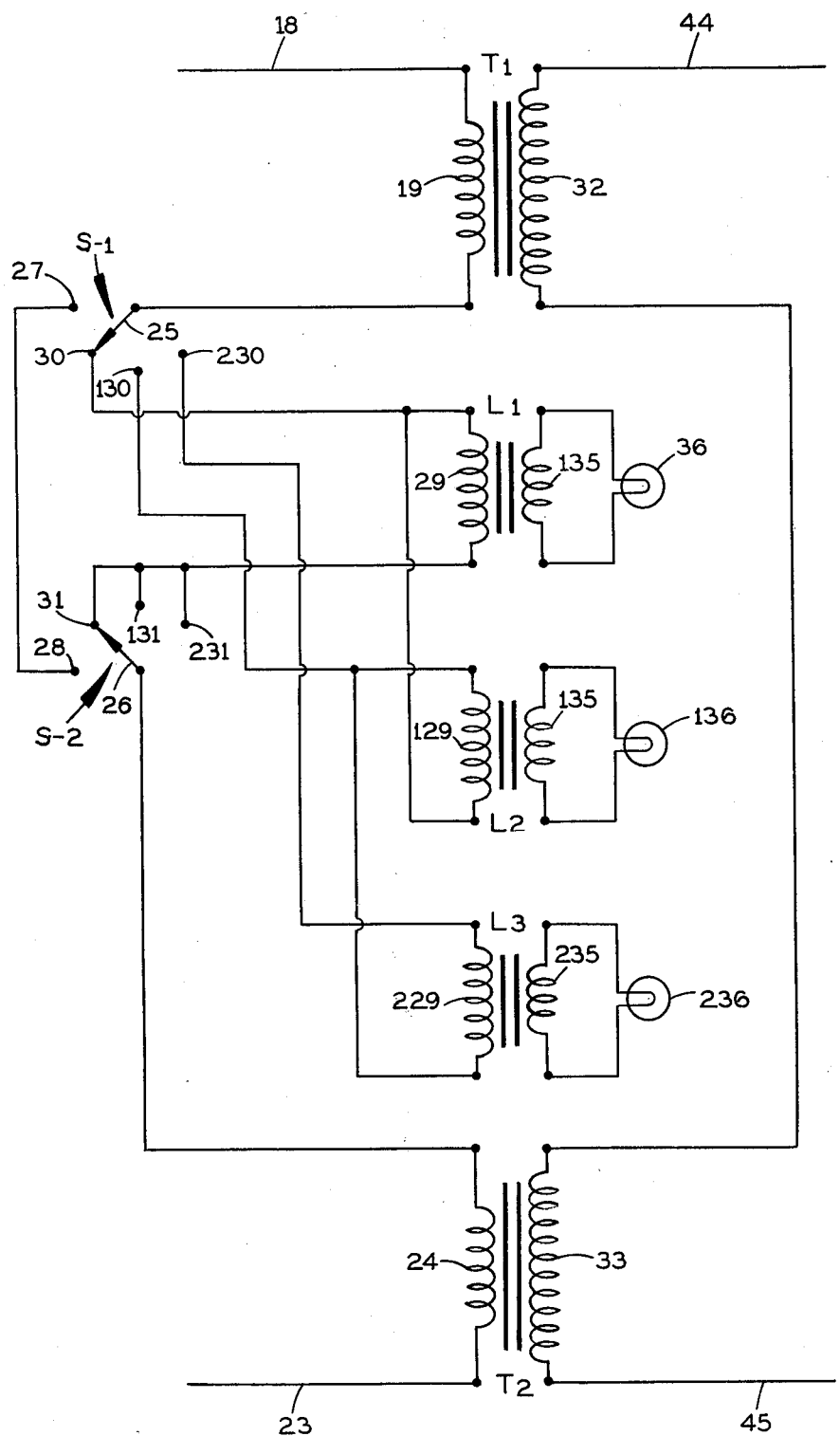
FIG. 2 is a circuit diagram showing part of a second embodiment.

FIG. 2 shows in part a modified transformer circuit in accordance with the present invention. Elements of the FIG. 2 circuit which correspond to those of the FIG. 1 circuit are given the same reference numerals. The elements not shown in FIG. 2 preferably are identical to those shown in FIG. 1.

In FIG. 2, the upper primary switch S-1 has two additional fixed contacts 130 and 230. Contact 130 is connected directly to the upper end of another primary winding 129, the lower end of which is connected directly to the upper end of the primary winding 29. Contact 230 is connected directly to the upper end of still another primary winding 229, the lower end of which is connected directly to the upper end of winding 129.

The lower primary switch S-2 has two additional fixed contacts 131 and 231 which, along with contact 31, are connected directly to the lower end of primary winding 29.

Another secondary winding 135 is inductively coupled to the primary winding 129 so that together they provide a transformer L-2. A lamp 136 is connected across winding 135.

Still another secondary winding 235 is inductively coupled to the primary winding 229, and together they constitute a transformer L-3 with a lamp 236 in its secondary circuit.

It will be apparent that the setting of switches S-1 and S-2 determines which ones, if any, of the transformers L-1, L-2 and L-3 are connected to be energized along with the transformers T-1 and T-2 which energize the D.C. output terminals 46 and 49. For example, when the fixed contacts 230 and 231 of these switches are engaged by the respective mobile contacts 25 and 26, the respective voltages applied across the primary windings 19 and 24 of transformers T-1 and T-2 will be reduced by the impedances of the primary windings 29, 129, 229. Alternatively, when the fixed contacts 130 and 131 of these switches are engaged by the respective mobile contacts 25 and 26, the respective voltages applied across the primary windings 19 and 24 will be reduced by the impedances of the primary windings 29 and 129 (but not the primary winding 229, which is disconnected in this switch position).

It will be apparent that the FIG. 2 circuit enables the D.C. output voltage appearing across terminals 46 and 49 to be adjusted in steps, dependent upon the setting of the switches S-1 and S-2. It is to be understood that any desired number of switch positions and corresponding transformers may be provided, depending upon the number of output voltage steps desired.

I claim:

1. In a D.C. power supply having a pair of input lines for connection across an A.C. power source:
   a first step-up transformer having a primary winding operatively connected to one of said input lines and having a first separate secondary winding inductively coupled to said primary winding;
   a second step-up transformer having a primary winding operatively connected to the other of said input lines and having a second separate secondary winding inductively coupled to said lastmentioned primary winding;
   switch means for connecting said primary windings in series with each other across said input lines;
   rectifier means operatively connected across said secondary windings to rectify the current induced therein;
   filter means operatively connected to said rectifier means to smooth fluctuations of the rectified current;
   and at least one additional step-down transformer having a primary winding and a third separate secondary winding inductively coupled thereto, and a load connected across said last-mentioned secondary winding;
   said switch means being selectively adjustable to connect the primary winding of said additional transformer in series with the primary windings of said first and second transformers across said input lines, whereby to reduce the voltage applied to the primary windings of said first and second transformers and thus reduce the rectified output voltage.

2. A power supply according to claim 1, wherein said load is a lamp for visually indicating the switch setting.

3. A power supply according to claim 1, wherein there are a plurality of said additional step-down transformers, and said switch means are selectively adjustable to connect the primary windings of a selected number of said additional transformers in series with the primary windings of said first and second transformers across said input lines.

4. A power supply according to claim 3, wherein each of said additional transformers has a lamp connected across its secondary winding.

* * * * *